Nov. 29, 1960 — M. LONG — 2,961,887
ROLLER-TYPE LINEAR ACTUATOR
Filed April 21, 1958 — 2 Sheets-Sheet 1

INVENTOR.
Marshall Long
BY
ATTORNEY.

Nov. 29, 1960 M. LONG 2,961,887
ROLLER-TYPE LINEAR ACTUATOR
Filed April 21, 1958 2 Sheets-Sheet 2
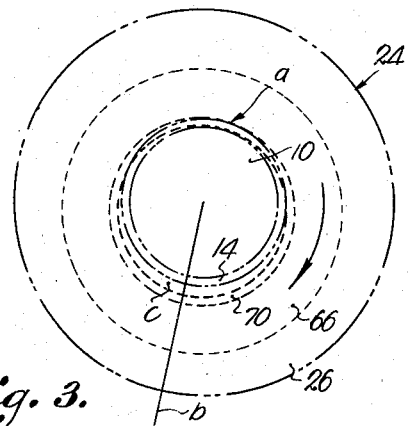
Fig. 3.
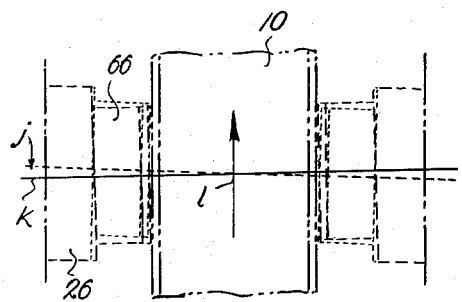
Fig. 6.
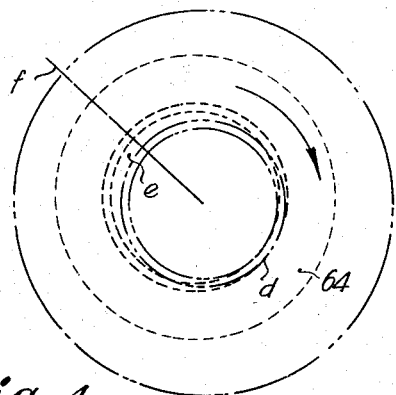
Fig. 4.
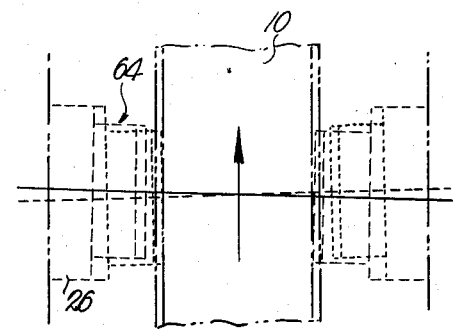
Fig. 7.
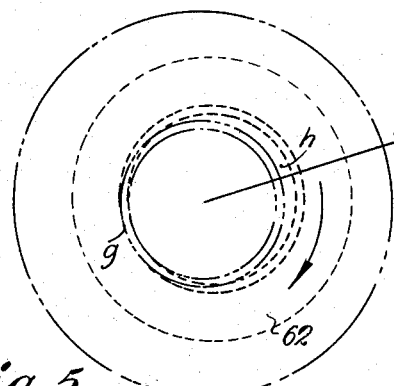
Fig. 5.
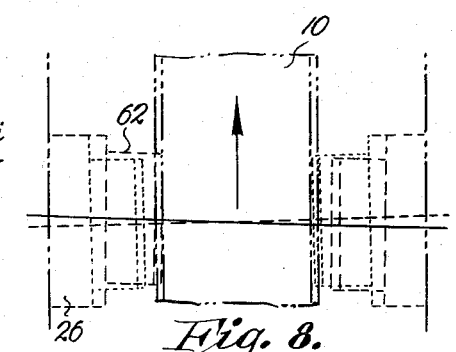
Fig. 8.
INVENTOR.
Marshall Long
BY 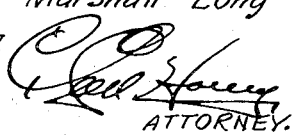
ATTORNEY.

United States Patent Office 2,961,887
Patented Nov. 29, 1960

2,961,887
ROLLER-TYPE LINEAR ACTUATOR
Marshall Long, 110th and Mission Road, Overland Park, Kans.
Filed Apr. 21, 1958, Ser. No. 729,888
8 Claims. (Cl. 74—424.8)

This invention relates to a linear actuator having essentially a pair of relatively reciprocable components, each adapted to either receive or impart motion, depending upon the manner of use of the invention and the results desired, one of such components being provided with rotatable parts for effecting such relative linear reciprocation of the said two components.

It is the most important object of the present invention to provide an assembly of the aforementioned character that eliminates many of the disadvantages of other types of linear actuators such as hydraulically motivated piston and cylinder assemblies, for example, racks and pinions, screws and followers or nuts, worms and worm gears, and many other mechanical movements, primarily because of the antifriction characteristics of the instant invention, and additionally, because of the high power which the same is capable of exerting and the positional control which is made possible thereby.

Another important object of the present invention is to provide in the over-all assembly an arrangement of parts such as to render the actuator troublefree over long periods of use, and long lasting, not only because of proper housing of all precision parts, lubricated or otherwise, but elimination of lubrication in those elements which are normally exposed to corrosion, dirt and other foreign material.

In carrying out the aforementioned objects, a novel relationship is employed between a screw and a series of rollers surrounding the screw. Ribs and grooves formed in the rollers mesh with the threads of the screw, notwithstanding the parallel relationship of such ribs and grooves because the latter are skewed to approximately the helix angle of the screw threads. Thereupon, in order to avoid frictional sliding between the intermeshing parts of the screw and collars, the latter are caused to roll along the screw so as to cause relative linear advancement or retrograde movement between the screw and the collar, as well as the entire body or unit which supports and actuates the collar.

Reference is had to the accompanying drawings for a better understanding of the invention as just above briefly analyzed, wherein.

Figure 1:
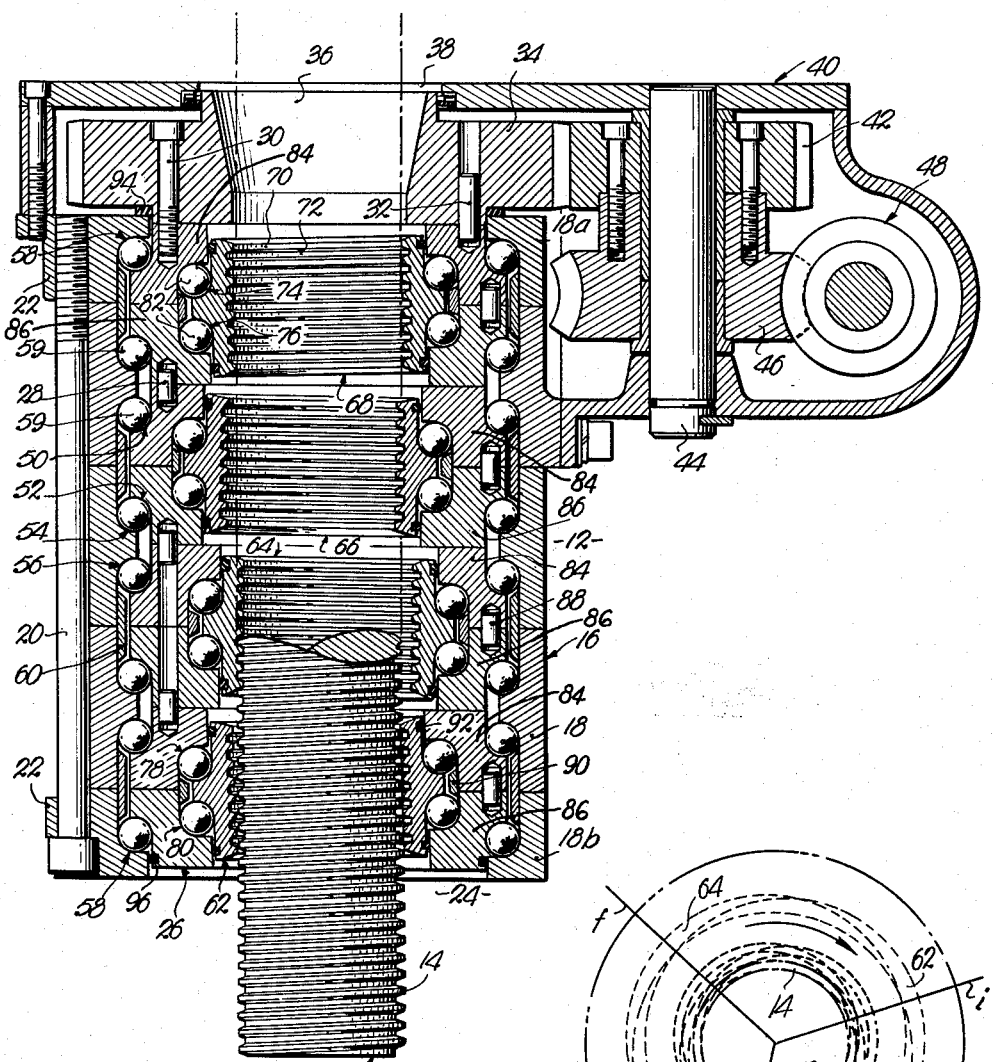
Fig. 1 is a vertical, cross-sectional view through a roller-type linear actuator made pursuant to my present invention.
Figure 2:
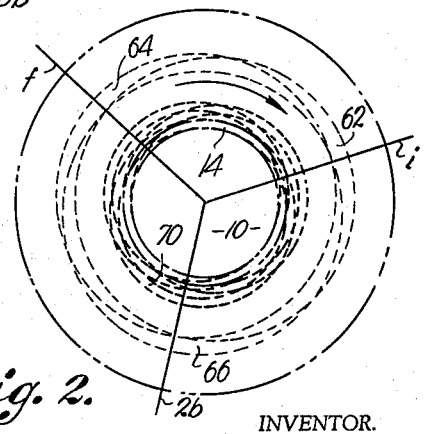
Fig. 2 is a schematic plan view illustrating diagrammatically the relative dispositions of three of the rollers when the same come to rest in the positions illustrated in Fig. 1.

Figs. 3, 4 and 5 are views similar to Fig. 2 illustrating the disposition of each of said three rollers respectively when in the position illustrated by Fig. 1; and Figs. 6 to 8 inclusive correspond to Figs. 3–5 respectively and constitute schematic cross-sectional views similar to Fig. 1 illustrating diagrammatically the angularity of each of said rollers respectively, not only when disposed as shown in Fig. 1, but when skewed to the maximum extent in the opposite direction and illustrating further the relationship of the ribs and grooves of each roller respectively to the screw threads of the shaft in each of two positions of the rollers.

In the practical embodiment of my invention chosen for illustration, there is provided two basic or primary components associated for relative reciprocation and including an elongated shaft 10, together with a composite structure or control unit broadly designated by the numeral 12.

The shaft 10, which may be advantageously made from tubular stock in many applications, is provided with external screw threads 14 throughout the length thereof whose helix angle may be preselected in accordance with the desires of the manufacturer to meet the requirements of the use to which the invention is to be placed. In this respect, therefore, it is to be understood that the adaptation of the commonly used style of Acme thread is for illustrative purposes only and is suggested merely because of its high strength characteristics. And, as will hereafter become apparent, the vertical disposition of the shaft 10 as shown, suggests but one manner of use of the actuator since the shaft 10 may be disposed horizontally or at any other desired angle, fixed or supported for movement in all directions during use.

The unit 12 includes a housing or cage 16 that is essentially tubular and disposed in surrounding relationship to the shaft 10. For convenience of manufacture, the cage 16 takes the form of a stack of separable sections 18, each of which may be exteriorly circular if desired, a plurality of fasteners 20 being employed to clamp the sections 18 rigidly together. The end ring sections 18a and 18b of cage 16 are provided with a series of peripheral, perforated (and tapped) wings or ears 22 for receiving the fasteners 20.

An elongated, tubular device broadly designated by the numeral 24, is housed within the cage 16 in surrounding relationship to the shaft 10 and supported by cage 16 for rotation about the longitudinal axis of the shaft 10, the axis of rotation of the device 24 being coincident with said axis of the shaft 10. Here again, for purposes of manufacturing and assembling expediencies, the device 24 preferably consists of a stack of initially separate sections 26 having annular, external peripheries concentric with the longitudinal axis of shaft 10 and circular, internal bores canted with respect to the shaft 10 for purposes to hereinafter be made clear.

The sections 26 of the device 24 are connected together for rotation as a unit through use of pins or the like 28 and suitable fasteners 30 and 32 are employed to attach one end of the device 24 to a gear 34 adjacent end section 18a of cage 16.

As a suggested manner of providing power requirements, there is shown a gear 34 having an enlarged bore 36 registering with an opening 38, both of which clear the shaft 10, opening 38 being formed in a gear case 40 detachably mounted on the cage 16. In addition to gear 34, the gear train in case 40 includes a pinion 42 rotatable on a stub axle 44 in mesh with gear 34 and attached to a worm gear 46 also rotatable on axle 44. Such gear train is driven to in turn rotate the device 24 by a worm 48 in mesh with worm gear 46 and in turn driven in any suitable manner (not shown) such as by use of a prime mover operably connected with the worm 48.

Each of the sections 26 of the rotatable device 24 is provided with a pair of parallel, oppositely facing, annular races 50 and 52 that are transversely arcuate and concentric with the longitudinal axis of shaft 10. Similarly, each section 18 of the cage 16 (except end sections 18a and 18b) is provided with a pair of corresponding annular, transversely arcuate races 54 and 56 that are likewise concentric with the longitudinal axis of the shaft 10. Manifestly, the end sections 18a and 18b are each provided with a single raceway 58. Antifriction means in the nature of ball bearings 59, interposed between the cage 16 and the device 24 within the aforementioned races, and annular ball bearing retention bands 60, are inserted within the cage 16 at each of the joints between the sections 18 thereof in surrounding relationship to each section 26 respectively of the device 24.

Each section 26 respectively of the rotatable device 24 receives and supports a cylindrical roller in a manner to permit free rotation of the device 24 with respect to such rollers. Two or more rollers may be employed, and for purposes of illustration, four rollers 62, 64, 66 and 68 are shown. The rollers may be identical and are disposed in surrounding relationship to the shaft 10, the inside diameter of each roller being greater than the diameter of the shaft 10. One or more internal ribs 70, and therefore, corresponding internal grooves 72, alternating with the ribs 70, are formed in each roller respectively. Ribs 70 and grooves 72 in each roller are in parallelism and concentric to the axis of the roller.

Oppositely facing, annular, transversely arcuate, external races 74 and 76 are provided on each roller in parallel relationship and concentric to the axes of the corresponding rollers. Associated annular races 78 and 80 are also provided in each section 26 respectively internally thereof for receiving ball bearings 82.

While each pair of races 78 and 80 are parallel and concentric to the corresponding roller which they surround, they are disposed to maintain the row of bearings 82 which they confine within a plane that is angularly displaced with respect to the planes within which the ball bearings 59 are positioned. The rollers are, therefore, supported by the sections 26 of device 24 in a canted position so that the axis of each roller is angularly displaced with respect to the longitudinal axis of the shaft 10.

The angularity of all rollers is the same, and roller 68 has the same circumferential relationship to screw 10 as roller 62. Additionally, the races 78 and 80 are formed in the sections 26 of device 24 to maintain the ball bearings 82, and, therefore, the races 74 and 76, as well as the axes of the rollers in eccentric relationship to the longitudinal axis of the shaft 10. Accordingly, the sections 26 hold the rollers in a position where only a portion of the ribs 70 and grooves 72 mesh with the screw threads 14 of shaft 10, and the angularity of each of the rollers is such as to skew the ribs 70 and grooves 72 to the preselected helix angle of the screw threads 14.

Each section 26 consists preferably of a pair of rings 84 and 86 interconnected by pins 88 and an annular band 90 at the joints thereof within each section 26 respectively, in surrounding relationship to the rollers, maintain each of the two sets of ball bearings 82 apart.

Suitable glands 92 surrounding the annular peripheries of each of the rollers between the latter, and the annular bores of the sections 26, serve to seal all of the ball bearings in cooperation with additional glands 94 and 96 adjacent the end sections 18a and 18b. Consequently, only the screw threads 14 and the ribs and grooves 70—72 are exposed, and since the latter do not slide with respect to the screw threads 14, no lubrication is necessary, in fact, in most applications, should not be used.

The operation can best be understood by referring to Figs. 2 to 8 inclusive. Fig. 3 illustrates one position of roller 66 with respect to shaft 10, the letter "a" indicating the point in the circumference of roller 66 where ribs 70 and grooves 72 of roller 66 are in full engagement with the screw threads 14. It is noted that the point "a" is in diametrical alignment with an imaginary line "b" employed for illustrative purposes only, such line "b" intersecting the area of maximum spacing between the ribs 70 and grooves 72 or roller 66, and the screw threads 14, the said space being designated by the letter "c."

When the roller 66 is in the position shown in Fig. 3, the roller 64 (see Fig. 4) is disposed where maximum intermeshing relationship between its ribs and grooves 70—72, and screw threads 14, is at point "d" displaced approximately 120 degrees to point "a" circumferentially of shaft 10. By the same token, maximum spacing at "e" between roller 64 and shaft 10 intersected by imaginary line "f," is offset 120 degrees with respect to maximum spacing "c."

Finally, Fig. 5 illustrates that points "g" and "h" of maximum meshing and spacing respectively in the case of roller 62, are offset 120 degrees from points "a" and "c," and points "d" and "e" respectively. Imaginary line "i" in Fig. 5 intersects the space "h" and is diametrically opposed to the point "g." The three lines "b," "f" and "i" graphically depict therefore, the relative positions of the three rollers 62, 64 and 66 at one point in the cycle of operation, it being understood, of course, that the points "a," "d" and "g" revolve around the shaft 10 and always remain in the same 120 degrees spaced relationship. By the same token, the points "c," "e" and "h" in effect, travel around the shaft 10 and their 120 degree displacement circumferentially of the shaft 10 remains fixed. Obviously, such lettered points all travel in the same direction as indicated by the arrows in Figs. 3, 4 and 5 when the relative reciprocation between the shaft 10 and the unit 12 is in one direction and such points travel in the opposite direction when the relative reciprocation is reversed.

The extent of intermeshing relationship of any one rib 70 with screw threads 14 may vary and will depend in part upon the relationship of the inside diameters of the rollers to the outside diameter of the shaft 10, as well as upon the nature of the threads 14 themselves, and the ribs and grooves 70—72.

Thus, the pitch, depth, shape and angularity of the developed surface of these intermeshing parts will have a direct bearing upon the design characteristics chosen by the manufacturer. For the most part, each rib 70 is at all times in overlapping engagement with at least a portion of the proximal screw thread length for approximately 140 degrees circumferentially of the shaft 10. This means that the total full and partial intermeshing interengagement for the three rollers 62, 64 and 66 is at least 420 degrees.

The roller 68 is shown positioned precisely as the roller 62 and is added merely for stability, but not essential to the operation of the invention. It illustrates however, that, as additional rollers are provided within a longer cage, their relative positions, insofar as angularity is concerned, should follow the same progressive arrangement illustrated in rollers 62, 64 and 66, but the points of maximum intermeshing may be arranged in any suitable pattern in the additional rollers.

Fig. 2 of the drawings showing all three rollers 62, 64 and 66, illustrates clearly through the imaginary lines "b," "f" and "i," the relative positions of such rollers circumferentially of shaft 10.

Figs. 6 to 8 inclusive show the manner of movement of the rollers with respect to the transverse axes of the shaft 10 and such movement may be likened to a wabble independently of, but simultaneously with the rolling of the rollers around the shaft 10 and progressive movement of such rollers with respect to the shaft 10 longitudinally of the latter.

Schematically, lines "j" and "k" in Fig. 6 illustrate the median transverse axis or plane of roller 66 parallel with rib 70. Such plane or axis tilts or wabbles transversely of the shaft 10 about an axis designated by the latter "l," i.e., the point of intersection of the longitudinal transverse axis of roller.

Figs. 6 to 8 inclusive illustrate also the relationship between the angular change represented by lines "j" and "k," and the change in the relationship of the rollers to the shaft 10 insofar as intermeshing is concerned while the rollers are caused to roll with respect to the shaft 10.

It is now clear that when the device 24 is caused to rotate within the cage 16, all of the rollers move around the shaft 10 without sliding friction between the ribs 70 and the threads 14. If, for example, therefore, the shaft 10 and the unit 12 are held against rotation, driving rollers 62—68 will cause the unit 12 to advance along the shaft 10 longitudinally of the latter when shaft 10 is itself held stationary, the direction of movement of the unit 2 with respect to the shaft 10, depending upon the direction of rotation of the device 24. Conversely, if the unit 12 is rigidly mounted and shaft 10 held against rotation about its own longitudinal axis, the said shaft 10 will be projected linearly in either of two directions.

Many uses may be made of the linear actuator above described, and by way of example only, it is suggested that the same has wide use in the field of lifting, as for instance, in raising concrete building slabs to form the various floor levels of such structure after the slabs are initially poured in stacked relationship at ground level. In that instance, the inherent weight of the slabs on the unit 12 or attachment of unit 12 to the slab will hold the latter against rotation and the shaft 10 will likewise be prevented from rotating by virtue of the fact that it supports the slab by resting on or attachment to an underlying ground level supporting foundation or an upright column. Or, conversely, if the slab is affixed to a plurality of shafts 10, the unit 12 remains at ground level as the shafts 10 are projected upwardly in unison.

The actuator will also, in many applications, supplant hydraulic piston and cylinder assemblies, as for example, in actuation of landing gear in aircraft, thereby providing a more positive, trouble-free arrangement than that afforded by hydraulic systems now in common use. In many instances it is inconvenient, if not impractical, to maintain a hydraulic or pneumatic pressure system in stand-by condition over long periods of time, whereas, in the instant invention, the actuator is at all times ready for instantaneous use.

The actuator will also supplant many other mechanical movement contrivances now in use such as carriage movement and other components in machine tools and the like now commonly actuated through various types of worms, followers, racks and other linear assemblies.

In view of such wide applicability of the invention, no specific use for the actuator has been illustrated in the drawings, but its application will become readily apparent to those skilled in this field.

Having thus described the invention what is claimed as new and desired to be secured by Letters Patent is:

1. An antifriction linear actuator comprising an elongated shaft provided with external screw threads having a preselected helix angle; and structure surrounding the shaft, said shaft and said structure being relatively reciprocable longitudinally of the shaft and said structure including a plurality of cylindrical rollers threaded on the shaft and each provided with an internal rib skewed to said helix angle of the screw threads, means supporting the rollers with a portion only of the rib of each roller in mesh with the screw threads, and means operably coupled with the rollers for rolling the same around the shaft whereby to effect relative movement of the shaft and said structure when the same are held against rotation.

2. An antifriction linear actuator comprising an elongated shaft provided with external screw threads having a preselected helix angle; and structure surrounding the shaft, said shaft and said structure being relatively reciprocable longitudinally of the shaft and said structure including a plurality of cylindrical rollers threaded on the shaft and each provided with an internal rib skewed to said helix angle of the screw threads, rotatable means surrounding the rollers and supporting the same with a portion only of the rib of each roller in mesh with the screw threads, and means operably coupling the rotatable means with the rollers for rolling the same around the shaft as the rotatable means is rotated whereby to effect relative movement of the shaft and said structure when the same are held against rotation.

3. An antifriction linear actuator comprising an elongated shaft adapted to receive or impart motion and provided with external screw threads having a preselected helix angle; and a control unit including a support, a device carried by said support for rotation around the shaft, a plurality of cylindrical rollers threaded on the shaft and each provided with a number of internal ribs and alternate grooves in parallel relationship and concentric to the axis of the roller, said device supporting the rollers with said axes thereof angularly offset to the longitudinal axis of the shaft whereby to skew the ribs and grooves to said helix angle of the screw threads, and with a portion only of the ribs and grooves of each roller in mesh with the screw threads, and means operably coupled with said device for rotating the same to roll the rollers around the shaft whereby to effect relative movement of the shaft and said unit when the shaft and the support are held against rotation.

4. An antifriction linear actuator comprising an elongated shaft adapted to receive or impart motion and provided with external screw threads having a preselected helix angle; and a control unit including a support, a tubular device surrounding the shaft and carried by said support for rotation relative to the support and the shaft about an axis coincident with the longitudinal axis of the shaft, a plurality of cylindrical rollers threaded on the shaft and each provided with a number of internal ribs and alternate grooves in parallel relationship and concentric to the axis of the roller, said device supporting the rollers with said axes thereof angularly offset to the longitudinal axis of the shaft whereby to skew the ribs and grooves to said helix angle of the screw threads, said device having an internal bore provided with a section surrounding each roller respectively and eccentric to said longitudinal axis of the shaft whereby to maintain a portion only of the ribs and grooves of each roller in mesh with the screw threads, the inside diameter of the rollers being greater than the external diameter of the shaft, and said axes of the rollers intersecting said axis of the shaft at different angles, and means operably coupled with said device for rotating the same to roll the rollers around the shaft whereby to effect relative movement of the shaft and said unit when the shaft and the support are held against rotation.

5. An antifriction linear actuator comprising an elongated shaft adapted to receive or impart motion and provided with external screw threads having a preselected helix angle; and a control unit including a tubular cage surrounding the shaft and having an internal surface concentric with the longitudinal axis of the shaft, a tubular device surrounding the shaft and carried by the cage therewithin for rotation about an axis coincident with said axis of the shaft, said device having a series of interconnected sections each provided with a bore, a cylindrical roller mounted within each bore respectively for free rotation of the sections relative to the rollers, the diameter of the shaft being less than the internal diameter of the rollers, each roller being provided with a number of internal ribs and alternate grooves in parallel relationship and concentric to the axis of the roller, said bores being eccentric to said axis of the shaft and supporting the rollers with their axes at an angle to said axis of the shaft whereby to skew the ribs and grooves to said helix angle of the screw threads and hold only a portion of each rib and groove of each roller in mesh with the screw threads, and means connected with said device for rotating the same to roll the rollers around the shaft whereby to effect relative advancement of the shaft and said unit when the shaft and the cage are held against rotation.

6. The invention of claim 5, and antifriction means between the cage and the device.

7. The invention of claim 5, said means for rotating the device being carried by the cage.

8. The invention of claim 5, said cage having a number of releasably interconnected parts, one surrounding each section respectively of said device.

References Cited in the file of this patent
UNITED STATES PATENTS

| | | |
|---|---|---|
| 2,482,082 | Wahlberg | Sept. 13, 1949 |
| 2,556,572 | Brinkhurst | June 1, 1951 |
| 2,616,302 | Wahlberg | Nov. 4, 1952 |
| 2,776,577 | Olchawa | Jan. 8, 1957 |
| 2,778,239 | Hoover | Jan. 22, 1957 |